July 30, 1963 H. L. HOWLING 3,099,527
PURIFICATION OF LEACH LIQUOR CONTAINING LITHIUM VALUES
Filed April 23, 1959
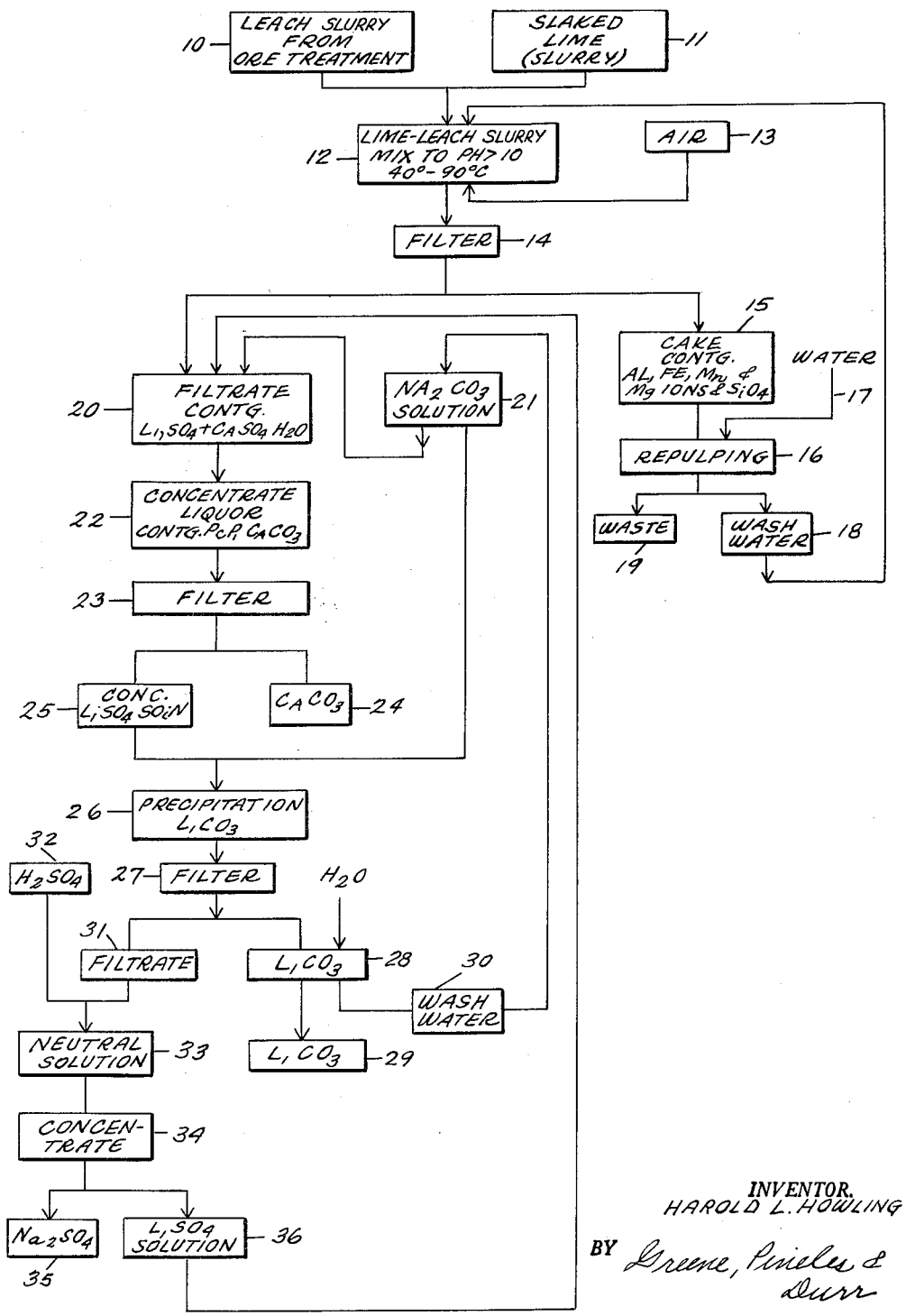
INVENTOR.
HAROLD L. HOWLING
BY *Greene, Pineles & Durr*
ATTORNEYS

United States Patent Office 3,099,527
Patented July 30, 1963

3,099,527
PURIFICATION OF LEACH LIQUOR CONTAINING LITHIUM VALUES
Harold L. Howling, Reading, Mass., assignor, by mesne assignments, to Basic Atomics Incorporated, New York, N.Y., a corporation of Delaware
Filed Apr. 23, 1959, Ser. No. 808,497
5 Claims. (Cl. 23—33)

This invention relates to a process of purifying aqueous liquors obtained by leaching ores which have been treated to solubilize the lithium content thereof.

This invention is particularly related to the purification of lithium leach liquors containing lithium as lithium sulfate obtained from aluminum silicate ores of lithium by a process which includes leaching the ore with a liquid containing sulfuric acid. In the treatment of such ores the spodumene, lepidolite, petalite, etc. are transformed sufficiently by decrepitation or by a high pressure sulfuric acid treatment as disclosed in U.S. application Serial No. 667,994, filed June 25, 1957, with George P. Robinson as inventor, now abandoned but disclosed and claimed in continuation-in-part Serial No. 802,517, filed March 27, 1959, now Patent No. 2,893,576. In these processes the leaching of the treated ore products provides a leach liquor which contains other salts as well as the soluble lithium sulfate and from which the lithium values must be separated.

The precipitation of the main bulk of the impurities of such leach slurries is ordinarily carried out in two or more steps comprising firstly, neutralizing the slurry to approximately pH 6.5 with crushed limestone or slaked lime, filtering to remove the precipitate and secondly, making the liquor distinctly alkaline by treating with caustic soda or slaked lime, followed by treating with soda ask to precipitate additional impurities. After filtering the solution is rendered approximately neutral, usually by addition of sulfuric acid, to complete the removal of impurities before lithium recovery. Lithium is commonly recovered by concentrating this purified solution and treating with soda ash to precipitate the lithium as lithium carbonate which is then recovered by filtration. It is common practice to use the residual liquor as a source of by-product sodium sulfate which is recovered by concentration and crystallization.

This invention is based on the discovery that the liquors at various stages of the concentration and precipitation steps can tolerate the presence of precipitated materials so that each impurity precipitated from the solution need not be removed immediately as it is formed. By way of illustration of the advantages offered by this invention, it may be said that a commonly used purification process comprises four treatment stages and four filtration stages, whereas my invention comprises only two treatment stages and two filtration stages. Consequently, it has been found possible to reduce the number of filtering and other steps in the process and accordingly reduce the number of separate pieces of apparatus as well as the time required to purify and recover lithium carbonate from such leach liquors. In addition reagent consumption is reduced in relation to the prior art since the neutralization step is unnecessary, thus eliminating the need for acid and also reducing the soda ash requirement to precipitate lithium carbonate.

In the treatment of leach slurries, according to the present invention, for example, slaked lime is added thereto, in a single step, in sufficient quantities to precipitate all of the bulk of impurities and to bring the pH to at least 10 and preferably to about 11.5 or more. In addition to the previously mentioned advantages, this procedure confers the additional virtue of insuring complete precipitation of aluminum, since no sodium ions are added; it is a well-known fact that many aluminum compounds are amphoteric, that is under alkaline conditions such compounds as aluminates are formed, and since sodium aluminate is considerably more soluble than calcium aluminate it is a distinct advantage to avoid addition of sodium ions. Thus in those examples of the existing art where sodium-bearing alkalizers, such as caustic soda and soda ash are added, it is essential to halt neutralization at a pH of about 6.5 in order to filter off precipitated aluminum compounds. Any aluminum which passes through this stage of the process forms such compounds as sodium aluminate which remain in solution during the rest of the purification procedure to become a contaminant of the end product. In the practice of the present invention, conditions are such that any aluminum which would normally escape is scavenged from the solution by reacting with calcium to form such compounds as calcium aluminate thereby insuring the removal from the solution of substantially all of the aluminum. The iron, and any other oxidizable impurities, of the liquor at this high pH is oxidized either by passing air or other oxidizing gas therethrough or by the addition of conventional chemical oxidants, and the bulk impurities and residue are then separated by filtration. The resultant filtrate contains only gypsum as an essential impurity which is precipitated by adding the amount of soda ash calculated to precipitate only the gypsum. After addition of the soda ash, the solution is concentrated before removing the precipitate.

A better understanding of the broad concept of the invention as well as an understanding of how the invention fits into the lithium recovery process as a whole can be obtained from a consideration of the drawing which is a flow sheet showing the sequence of steps in the process.

In the drawing, the leached slurry containing such things as excess leaching agent, leach products and residue 10, is mixed with slaked lime 11 in sufficient proportion to precipitate the bulk of the impurities. The resultant solution instead of first being carried to the pH of about 6.5 in a first step, filtered and then again treated with an alkali, is transformed to a mix 12 at a pH of at least 10 and preferably 11.5 or more in one step. The solution is conveniently maintained at a temperature of 40 to 90° C. thereby facilitating reaction and reducing viscosity, and air or other oxidizing gas 13 is passed therethrough, or a chemical oxidant is added, to oxidize the iron content to precipitate it in a form convenient for removal. Thereafter, the solution 12 is filtered as shown at 14. The resultant cake 15 can be washed at the filtering step 14, but better washing is obtained by repulping as shown at 16, treating with water 17 which is recovered (after filtering, centrifuging, decanting, etc.) as wash water 18 which is returned to the system at 12. Insofar as the present process is concerned the solid residue 19 which contains the Al, Fe, Mn and Mg ions and the silica is discarded.

The filtrate 20 from step 14 contains most of the lithium of the original liquor (as lithium sulfate) and a quantity of gypsum. A concentrated soda ash solution 21 is added to filtrate 20 in a predetermined quantity sufficient to precipitate the gypsum. Before filtering, however, the liquor is concentrated to ⅕ to ¹⁄₂₀ of its volume as shown at 22 and thereafter the solution of much smaller volume is filtered as shown in 23. The residue 24 of calcium carbonate is removed from the system and the concentrated solution 25 of lithium sulfate is treated with an excess of the saturated soda ash solution 21 to precipitate lithium carbonate as shown at 26. The slurry is filtered as shown at 27. The residue 28 which is lithium carbonate of over 95% purity on a total solids basis is washed with water which comes out as wash water 30 and is returned to the system as the solvent for the soda ash 21. The lithium carbonate 29, after drying, represents at least about 70% of the original lithium, and more generally 80% to 90% thereof. Substantially all of the remaining lithium is returned to the system in wash waters 18, 30, etc.

The filtrate 31 from step 27 contains some lithium and a substantial amount of sodium sulfate. To recover these values the filtrate 31 is neutralized with sulfuric acid 32. A neutral solution 33 is concentrated as shown in 34 to crystallize out the bulk of the sodium sulfate 35 which is separated from solution 36 containing the lithium values. Since solution 33 generally contains a much higher concentration of sodium sulfate than of lithium sulfate and since lithium sulfate has a greater solubility than sodium sulfate under these conditions, it is possible to recover by crystallization the bulk of sodium sulfate without contamination by lithium sulfate. Solution 36 is introduced back into the system at 20 (or 22).

The following specific examples further illustrate how the process is carried out.

Example 1

Three liters of slurry were obtained as a leach liquor from a mix obtained by treating finely ground spodumene ore with sulfuric acid at a temperature of about 265 to 275° C., at a pressure of about 400 p.s.i.g. by the process disclosed in United States application, Serial No. 667,994, filed June 25, 1957, with George P. Robinson as inventor. This slurry which was assayed to contain lithium values sufficient to produce 16.5 grams of lithium carbonate, was mixed with 155 grams of slurried, slaked lime and the temperature raised to about 90° C. to promote the reaction. Air was forced through the mix for approximately one hour to oxidize the iron. The pH of about 11.9 was recorded and the solution filtered. The filtrate was concentrated approximately 10 fold after adding 1.26 grams of soda ash to precipitate gypsum as the carbonate. The solution was filtered after concentrating and the filter cake when assayed showed no lithium content. This shows that the concentration stage can be run at a high pH in the presence of calcium carbonate without precipitating lithium. Seventy-five grams of soda ash, as a saturated solution in water, were added to precipitate the lithium carbonate which was removed by filtration and washed twice with 100 mls. of hot water. The lithium carbonate recovered was 11.4 grams or about 70% of the available 16.5 grams. The washes accounted for 1.62 grams of lithium carbonate and the mother liquor 31 accounted for substantially all of the remaining 3.48 grams. In the practice of the invention, it will be noted that the lithium values of the washes and mother liquor are all returned to the system. Lithium carbonate recovered had a purity of 97.5%.

The by-product liquor remaining after extraction of lithium values was treated with sulfuric acid to reduce the pH to 6.2, concentrated to about 50 mls. and cooled to recover sodium sulfate by crystallization. The yield was 91 grams, about 88% of the theoretically available 104 grams, and had a purity of better than 99%. It will be readily obvious to those skilled in the art that this recovery of sodium sulfate is in no way vital to the recovery of the primary lithium values but is a by-product recovery procedure which is frequently followed to improve the over-all economics of the process.

Example 2

Three liters of slurry were obtained as in Example 1 and this slurry, which was assayed to contain lithium values sufficient to produce 16.3 grams of lithium carbonate, was treated with 155 grams of slurried slake lime, the final temperature being 90° C. Hydrogen peroxide was added to oxidize the iron and the slurry filtered, the pH being 11.9 The filtrate was concentrated approximately 20 fold after adding 1.2 grams of soda ash to precipitate calcium as the carbonate. The solution was then filtered, the cake washed and assayed for lithium, none being found.

Lithium carbonate was precipitated from the filtrate by adding 75 grams of soda ash as a saturated solution in water; the carbonate was removed by filtration and washed twice with 100 mls. hot water. The lithium carbonate recovered was 13.2 grams or about 81.3% of the available 16.3 grams. The washes accounted for 1.55 grams and the mother liquor 1.48 grams of lithium carbonate, giving a closure of 99.5%. The lithium carbonate recovered had a purity of 99.2%. The liquor remaining after the extraction of lithium values was concentrated to about 40 mls. and cooled to recover sodium sulfate by crystallization. The yield was 99.5 grams, about 92.5 percent of the theoretically available 103.6 grams, and had a purity better than 99%.

Although the process has been described for leach solutions obtained by sulfuric acid under pressure treatment of finely ground spodumene, it works as well with other sulfuric acid leach solutions obtained from decrepitated spodumene or from similar lithium aluminum silicate ores, such as lepidolite and petalite.

The features and principles underlying the invention described above in connection with specific exemplifications will suggest to those skilled in the art many of the modifications thereof. It is accordingly desired that the appended claims shall not be limited to any specific feature or details thereof.

I therefore claim:

1. Process for separating lithium values from a sulfuric acid leach slurry, said slurry containing excess sulfuric acid leaching agent, lithium sulfate and residues from the reaction of sulfuric acid with the lithium ores, comprising adding, in one step, sufficient slaked lime to said leach slurry to raise the pH thereof to at least 10 whereupon the bulk of impurities including aluminum are precipitated, introducing an oxidizing agent into the thus treated slurry to effect oxidation of iron and other oxidizable impurities thereby precipitating the same, and only then filtering the resultant slurry to separate the ore residue and the various precipitates from the filtrate which contains the lithium in the form of lithium sulfate dissolved therein.

2. The process as claimed in claim 1 in which the oxidizing agent is air which is passed through the slurry.

3. The process as claimed in claim 1 in which the oxidizing agent is hydrogen peroxide which is added to said slurry.

4. The process as claimed in claim 1 in which sufficient slaked lime is added to said leach slurry to raise the pH to at least about 11.5.

5. The process as claimed in claim 1 in which the reactions are carried out with the slurry at a temperature of about 40°–90° C.

References Cited in the file of this patent

UNITED STATES PATENTS

| | | |
|---|---|---|
| 847,856 | Wadman | Mar. 19, 1907 |
| 1,544,114 | Weidmann | June 30, 1925 |
| 3,000,699 | Gauguin | Sept. 19, 1961 |
| 3,007,770 | Kawecki | Nov. 7, 1961 |

OTHER REFERENCES

Lowery: "Inorganic Chemistry," Macmillan and Co., Ltd., London; 2nd edition, 1931, page 269.

Hader et al.: "Industrial and Engineering Chemistry," volume 43, No. 12, December 1951, pages 2636–2646.

Ellestad: "Mining Engineering," volume 7, November 1955, pages 1045–47.

Laidler: "Lithium and Its Compounds," Royal Institute of Chemistry, Lectures, Monographs and Reports, No. 6, 1957.